(12) United States Patent
Miyamoto

(10) Patent No.: US 10,965,815 B2
(45) Date of Patent: Mar. 30, 2021

(54) INFORMATION PROCESSING APPARATUS AND INFORMATION PROCESSING METHOD

(71) Applicant: SONY CORPORATION, Tokyo (JP)

(72) Inventor: Kohei Miyamoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/470,073

(22) PCT Filed: Nov. 17, 2017

(86) PCT No.: PCT/JP2017/041426
§ 371 (c)(1),
(2) Date: Jun. 14, 2019

(87) PCT Pub. No.: WO2018/128014
PCT Pub. Date: Jul. 12, 2018

(65) Prior Publication Data
US 2020/0106884 A1    Apr. 2, 2020

(30) Foreign Application Priority Data

Jan. 6, 2017    (JP) .............................. JP2017-000883

(51) Int. Cl.
*H04M 3/56* (2006.01)
*G06K 9/00* (2006.01)
(Continued)

(52) U.S. Cl.
CPC ........ *H04M 3/567* (2013.01); *G06K 9/00241* (2013.01); *G06K 9/00355* (2013.01);
(Continued)

(58) Field of Classification Search
CPC ......... H04L 51/10; H04L 51/04; H04L 67/10; H04L 67/12; H04L 67/02; H04L 67/22;
(Continued)

(56) References Cited

U.S. PATENT DOCUMENTS

2011/0141220 A1    6/2011    Miura
2012/0327183 A1*   12/2012   Fujii ...................... H04N 7/157
                                                                348/14.12
(Continued)

FOREIGN PATENT DOCUMENTS

JP    2000-311077 A    11/2000
JP    2002-252839 A    9/2002
(Continued)

OTHER PUBLICATIONS

International Search Report and Written Opinion of PCT Application No. PCT/JP2017/041426, dated Dec. 19, 2017, 17 pages of ISRWO.

*Primary Examiner* — Jungwon Chang
(74) *Attorney, Agent, or Firm* — Chip Law Group

(57) ABSTRACT

Provided is an information processing apparatus that includes an acquisition unit and a generation control unit. The acquisition unit acquires input information including at least one of an image or audio of a first user. The generation control unit controls, on the basis of request information including a request to output information including at least one of an image or audio and the acquired input information, generation of output information related to the first user to be output by a terminal of a second user who is a communication partner of the first user.

16 Claims, 11 Drawing Sheets

(51) Int. Cl.
 *G10L 25/78* (2013.01)
 *H04L 29/08* (2006.01)
(52) U.S. Cl.
 CPC ............ *G10L 25/78* (2013.01); *H04M 3/568* (2013.01); *H04L 67/02* (2013.01); *H04L 67/12* (2013.01); *H04L 67/22* (2013.01)
(58) Field of Classification Search
 CPC ... G06F 16/9535; H04M 3/567; H04M 3/568; G10L 25/78; G06K 9/00241; G06K 9/00355
 See application file for complete search history.

(56) References Cited

U.S. PATENT DOCUMENTS

| | | | |
|---|---|---|---|
| 2013/0325959 A1* | 12/2013 | Takamura | H04L 67/10 709/204 |
| 2015/0195378 A1* | 7/2015 | Kano | G06F 16/9535 709/203 |
| 2016/0239547 A1* | 8/2016 | Lim | G06Q 30/0205 |
| 2017/0061989 A1* | 3/2017 | Dow | G06K 9/00315 |
| 2018/0077095 A1* | 3/2018 | Deyle | G10L 25/63 |

FOREIGN PATENT DOCUMENTS

| | | |
|---|---|---|
| JP | 2008-125025 A | 5/2008 |
| JP | 2010-004208 A | 1/2010 |
| JP | 2016-192687 A | 11/2016 |
| KR | 10-2011-0051257 A | 5/2011 |
| WO | 2010/024415 A1 | 3/2010 |
| WO | 2016/159165 A1 | 10/2016 |

* cited by examiner

Not missing | Missing lower half of body | Missing upper half (excluding face) and lower half of body | Missing entire body (with part of face)

Missing level: Low → High

| Auxiliary information | Intonation | Uttered sentence | Backchannel |
|---|---|---|---|
| Facial expression information | ○ | × | △ |
| Lip sync information | △ | ◎ | ◎ |
| Gesture information | △ | △(◎) | ◎ |
| Text information | △ | ◎ | ◎ |

◎ indicates being sufficiently complementable
○ indicates being complementable to some degree
△ indicates being complementable in some cases
× indicates being non-complementable

FIG.5

| Location | Time zone | Allowable presentation range of video | | | Allowable presentation range of audio | | | Position at which communication apparatus is placed |
|---|---|---|---|---|---|---|---|---|
| | | Lower half of body | Upper half of body | Face | Intonation | Sentence | Backchannel | |
| Home | — | △ | ○ | ○ | ○ | ○ | ○ | Desk |
| Conference room | — | × | ○ | ○ | ○ | ○ | ○ | Wall, desk |
| Train | — | × | △ | △ | × | × | × | In hand |
| Car | Daytime | × | △ | ○ | ○ | ○ | ○ | Hood, center console |
| | Night | × | × | × | ○ | ○ | ○ | Hood, center console |
| Airplane | — | × | △ | ○ | △ | △ | ○ | Desk |
| Library | — | △ | ○ | ○ | △ | ○ | ○ | Desk |
| Live show venue | — | × | △ | ○ | △ | △ | | In hand |
| Restaurant | — | × | ○ | ○ | × | ○ | ○ | Table |
| Diving | — | △ | △ | △ | × | × | × | In hand |

FIG.6

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2017/041426 filed on Nov. 17, 2017, which claims priority benefit of Japanese Patent Application No. JP 2017-000883 filed in the Japan Patent Office on Jan. 6, 2017. Each of the above-referenced applications is hereby incorporated herein by reference in its entirety.

TECHNICAL FIELD

The present technology relates to an information processing apparatus, an information processing method, and a program which are applicable to remote communication and the like.

BACKGROUND ART

A technology of sharing images and audio between users via a network or the like and performing remote communication is conventionally known. For example, users located at remote places are able to send and receive their video and audio to/from each other in real time. With this configuration, even users located at remote places can communicate with each other while grasping the state of the partner.

For example, Patent Literature 1 has disclosed a television conference system in which users located at different places can send and receive images and audio to/from each other. In Patent Literature 1, whether or not the user is making a gesture is determined on the basis of a captured image of the user. If the user is making the gesture, an image of the upper half of the body of the user is cut from the captured image. If the user is not making the gesture, an image of the face of the user is cut. The cut image of the upper half of the body or the cut image of the face is sent to a terminal apparatus on a partner side and is displayed on a display. With this configuration, it is possible to smoothly conduct television conference while making gestures and favorable communication can be performed (paragraphs [0030], [0057], and [0092] of the specification, FIGS. 5 and 6, and the like in Patent Literature 1)

CITATION LIST

Patent Literature

Patent Literature 1: Japanese Patent Application Laid-open No. 2010-239499

DISCLOSURE OF INVENTION

Technical Problem

It is considered that remote communication via a network and the like will be widely spread from now on. Thus, it is desirable to provide a technology that enables favorable remote communication to be performed.

In view of the above-mentioned circumstances, it is an object of the present technology to provide an information processing apparatus, an information processing method, and a program which enable favorable remote communication to be performed.

Solution to Problem

In order to accomplish the above-mentioned object, an information processing apparatus according to an embodiment of the present technology includes an acquisition unit and a generation control unit.

The acquisition unit acquires input information including at least one of an image or audio of a first user.

The generation control unit controls, on the basis of request information including a request to output information including at least one of an image or audio and the acquired input information, generation of output information related to the first user to be output by a terminal of a second user who is a communication partner of the first user.

In this information processing apparatus, generation of the output information related to the first user is controlled on the basis of the input information and the request information related to the output information. With this configuration, for example, generation of the output information according to the request and the like from the second user who is the communication partner can be performed and favorable communication can be performed.

The request information may include at least one of a request from the second user, which is related to image display, or a request from the second user, which is related to audio reproduction.

With this configuration, various requests related to display of the image and reproduction of the audio can be made and favorable communication can be performed.

The generation control unit may complement the image of the first user, which is included in the input information, and generate the output information.

With this configuration, it is possible to generate the output information according to the request and favorable communication can be performed.

The generation control unit may complement the audio of the first user, which is included in the input information, and generate the output information.

With this configuration, it is possible to generate the output information according to the request and favorable communication can be performed.

The information processing apparatus may further include: a calculation unit; and a reliability sending unit.

The calculation unit calculates reliability of the output information.

The reliability sending unit sends the calculated reliability to the terminal of the second user.

With this configuration, to what degree the image and the audio included in the output information is reliable, for example, can be determined. As a result, for example, updating and the like of the request information can be performed and favorable communication can be performed.

The reliability of the output information may include at least one of reliability related to the image or reliability related to the audio.

With this configuration, for example, reliability of the image and the audio can be determined and favorable communication can be performed.

The request information may include a request related to the reliability of the output information.

With this configuration, request related to the reliability can be performed and favorable communication can be performed.

The information processing apparatus may further include an estimation unit that estimates a generatable level of the output information on the basis of at least one of state information of the first user or situation information of the first user.

With this configuration, for example, the generatable level of the output information can be compared to the request from the second user and the like and favorable communication can be performed.

The level of the output information may include at least one of a displayable level of the image of the first user or a reproducible level of the audio of the first user.

With this configuration, comparison of a generation level to the request and the like can be performed with respect to the image and the audio of the first user and favorable communication can be performed.

The information processing apparatus may further include a level sending unit that sends the estimated level of the output information to the terminal of the second user.

With this configuration, for example, updating and the like of the request information can be performed in accordance with the generatable level and favorable communication can be performed.

The information processing apparatus may further include a request information output unit that outputs the updated request information sent from the terminal of the second user receiving the generated output information to the generation control unit.

With this configuration, desired output information can be requested and favorable communication can be performed.

The request information output unit may output the updated request information based on contents of the output information and the reliability of the output information to the generation control unit.

With this configuration, for example, flexible request according to the contents of the output information and the like can be performed and favorable communication can be performed.

The request information output unit may output the updated request information based on the generatable level of the output information to the generation control unit.

With this configuration, for example, flexible request according to the generatable level of the output information and the like can be performed and favorable communication can be performed.

At least one of the acquisition unit or the generation control unit may be provided in a server apparatus capable of communicating with each of a terminal of the first user and the terminal of the second user.

With this configuration, for example, a cloud computing configuration can be realized.

An information processing method according to an embodiment of the present technology is an information processing method executed by a computer system, the information processing method including acquiring input information including at least one of an image or audio of a first user.

Generation of output information related to the first user to be output by a terminal of a second user who is a communication partner of the first user is controlled on the basis of request information including a request to output information including at least one of an image or audio and the acquired input information.

A program according to an embodiment of the present technology causes a computer system to execute the following steps.

A step of acquiring input information including at least one of an image or audio of a first user.

A step of controlling, on the basis of request information including a request to output information including at least one of an image or audio and the acquired input information, generation of output information related to the first user to be output by a terminal of a second user who is a communication partner of the first user.

Advantageous Effects of Invention

As described above, in accordance with the present technology, favorable remote communication can be performed. It should be noted that the effects described here are not necessarily limitative and any effect described in the present disclosure may be provided.

BRIEF DESCRIPTION OF DRAWINGS

FIG. 5 A table showing an example of a range complementable on the basis of auxiliary information.

FIG. 6 A table for describing relevance between environment information and a generatable level of communication data.

MODE(S) FOR CARRYING OUT THE INVENTION

Hereinafter, embodiments according to the present technology will be described with reference to the drawings.

[Communication System]

Figure 1:
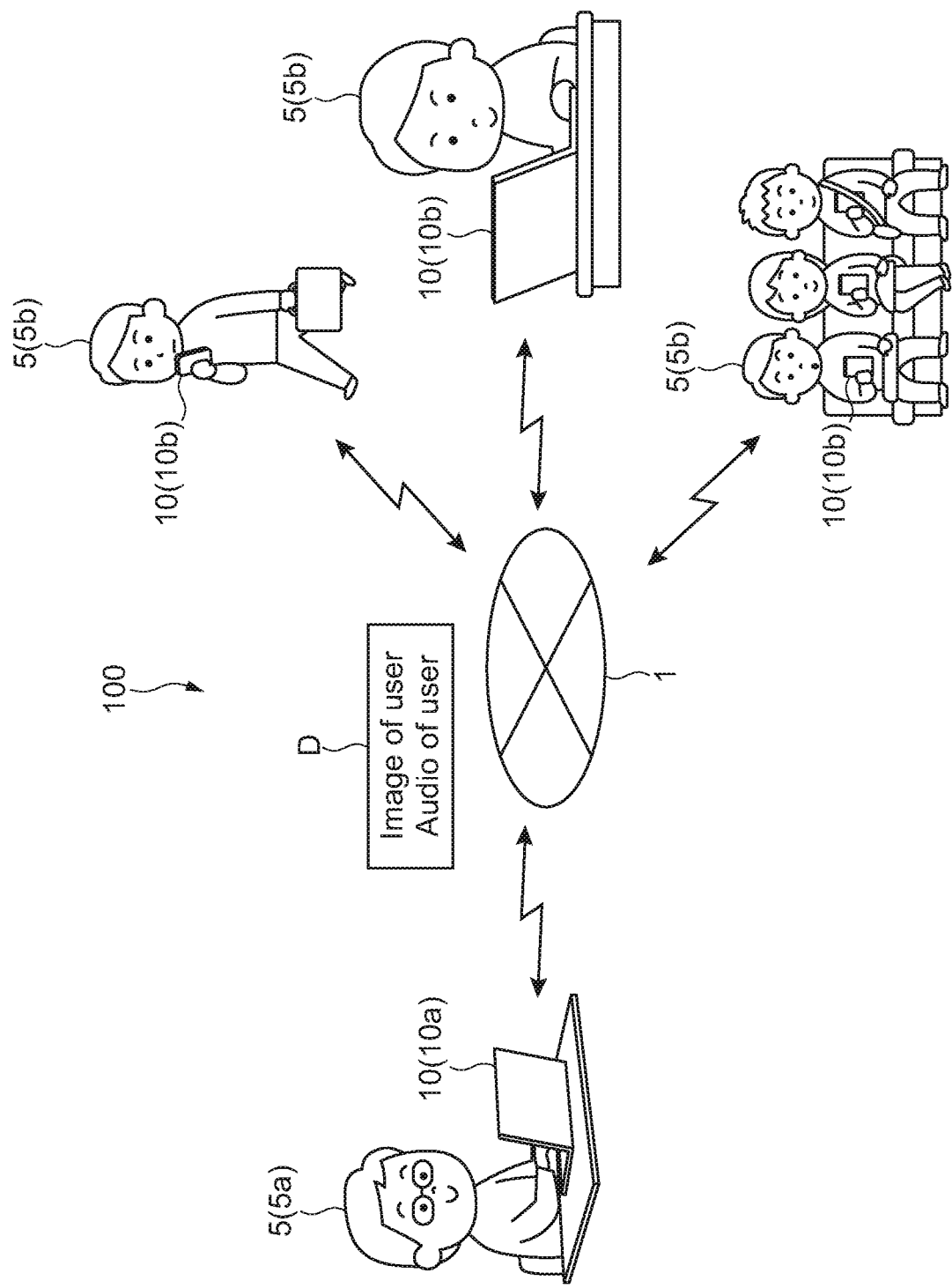
FIG. 1 A schematic view for describing the outline of a communication system according to an embodiment.

FIG. 1 is a schematic view for describing the outline of a communication system according to an embodiment of the present technology. A communication system 100 enables persons who perform communication (users 5 of communication terminals 10) to perform remote communication with each other via the communication terminals 10 connected to a network 1.

The communication system 100 is an embodiment of an information processing system according to the present technology. The communication terminals 10 is an embodiment of an information processing apparatus according to the present technology.

A wide area network (WAN) such as the Internet is typically used as the network 1, though not limited thereto. The present technology is applicable to any network including a local area network (LAN) such as an intranet and the like.

In the example shown in FIG. 1, a case where a user 5a who uses a communication terminal 10a and users 5b who use communication terminals 10b are performing remote communication is shown.

The user 5a is sitting and a laptop personal computer (PC) placed on a desk is used as the communication terminal 10a.

Regarding the users 5b, a walking state, a sitting state, and a being-in-train state are shown. In any state, communication with the user 5a can be performed by using a smartphone and a laptop PC as the communication terminals 10b. It should be noted that in order to perform remote communication, a terminal used at that time is the communication terminal 10 of that user 5.

In this embodiment, the communication terminal 10 generates communication data D including at least one of an image or audio of the user 5 as output information. The generated communication data D is sent and output to the communication terminal 10 of the communication partner via the network 1. By sending and receiving their communication data D, the remote communication is realized.

In this embodiment, a user who inputs input information including at least one of an image or audio of the user corresponds to a first user. Further, a user who acquires output information based on the input information, which is input, corresponds to a second user. In communication, a sender side of the communication data D (input side of the input information) is switched between the users. Therefore, in a case where either one of the user 5a and the user 5b corresponds to the first user, the other corresponds to the second user.

It should be noted that a specific communication algorithm for communicating the communication data D is not limited and compression/decompression, encryption/decryption, and the like of data may be executed as appropriate.

In this embodiment, regarding the communication data D generated by the communication terminals 10, request information indicating what kind of communication data D is required can be sent and received to/from each other. With this configuration, favorable remote communication can be performed. It will be described later in detail.

[Communication Terminal]

Figure 2:
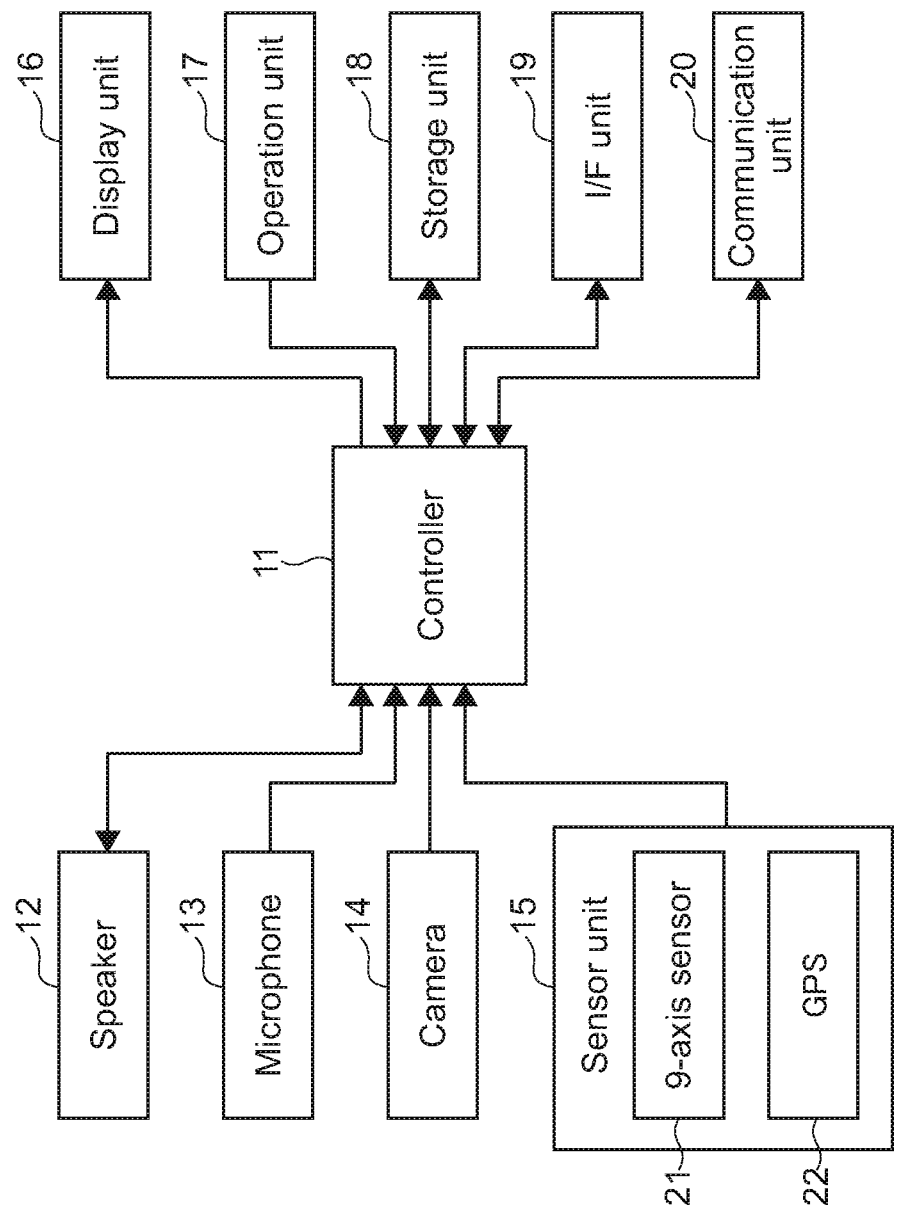
FIG. 2 A block diagram showing a configuration example of a communication terminal.

FIG. 2 is a block diagram showing a configuration example of the communication terminal 10. The communication terminal 10 includes a controller 11, a speaker 12, a microphone 13, a camera 14, and a sensor unit 15. Further, the communication terminal 10 includes a display unit 16, an operation unit 17, a storage unit 18, an interface (I/F) unit 19, and a communication unit 20.

Audio and the like of the communication partner are reproduced through the speaker 12. Audio and the like of the user 5 are captured by the microphone 13. An image and the like of the users 5 are captured by the camera 14. Additionally, the speaker 12, the microphone 13, and the camera 14 may enable output of audio guidance, reproduction of music content, input of instructions as audio or according to gestures, and the like to be performed. Specific configurations of the speaker 12, the microphone 13, and the camera 14 are not limited.

The image captured by the camera 14 and the audio captured by the microphone 13 correspond to input information including an image and audio in this embodiment. It should be noted that the image captured by the camera 14 includes both of a still image and a moving image (video).

The display unit 16 is, for example, a display device using crystal liquid, electro-luminescence (EL), and the like. Images of the communication partner, various types of graphical user interfaces (GUIs), and the like are displayed on the display unit 16. The operation unit 17 includes a keyboard, a pointing device, a touch panel, other operation apparatuses, for example. In a case where the operation unit 17 includes a touch panel, that touch panel can be integral with the display unit 16.

The storage unit 18 is a nonvolatile storage device. A hard disk drive (HDD) or the like is used as storage unit 18, for example. In the storage unit 18, various programs including a control program, an application, and the like for controlling general operations of the communication terminal 10 are stored. Further, a table information and the like for generating the communication data D are stored in the storage unit 18. A method of installing the control program, the table information, and the like into the communication terminal 10 is not limited.

The I/F unit 19 is an interface to which other devices and various cables of a universal serial bus (USB) terminal, a high-definition multimedia interface (HDMI (registered trademark)) terminal, and the like are connected.

The communication unit 20 is a communication module for communicating with other devices via the network 1. For example, a wireless LAN module such as Wi-Fi is used as the communication unit 20. Otherwise, a communication module for short-distance wireless communication such as Bluetooth (registered trademark) may be provided as the communication unit 20.

The sensor unit 15 includes a 9-axis sensor 21 and a GPS sensor 22. The 9-axis sensor 21 outputs changes in angle, movement, and direction of the main body of the communication terminal 10. The GPS sensor 22 outputs position information of the main body of the communication terminal 10. Otherwise, the type of the sensor provided as the sensor unit 15 is not limited and any sensor may be provided. For example, a biosensor and the like capable of detecting the body temperature and the pulse rate of the user 5 and the like may be provided.

The sensor unit 15 functions as a motion sensor, for example, and is capable of detecting the state of the user 5 including the attitude, the motion, and the like of the user 5. For example, information indicating walking, running, moving by train, driving, or the like and information indicating the type of playing sports or the like are acquired as state information of the user 5.

Further, the sensor unit 15 is capable of detecting a situation of the user 5. That is, it is capable of acquiring situation information of the user 5 including information regarding the state of a target associated with the user 5, such as the state of the communication terminal 10 used by the user 5, the point of time, the location, and the like. For example, information regarding the current location of the user 5, more specifically, information regarding being indoor or outdoor, information regarding being in conference or not, or the like, information regarding specifications and information regarding a position at which the communication terminal 10 is placed, and the like are acquired as the situation information of the user 5.

Those various types of state information and situation information of the user 5 can be acquired by using any technology such as activity analysis using machine learning, for example. As a matter of course, the state information and the situation information of the user 5 may be acquired by cooperation of the sensor unit 15 with the other blocks.

In this embodiment, the environment information of the user 5 who performs remote communication is acquired as information including the state information and the situation information of the user 5. The environment information includes a location of the user, time, specifications of the communication terminal 10, states of the user 5 and the communication terminal 10, and the like.

The controller 11 controls operations of the respective blocks of the communication terminal 10. The controller 11 includes a hardware configuration required for a computer, such as a CPU and a memory (RAM, ROM), for example. By the CPU loading the control program stored in the storage unit 18 into the RAM and executing it, various types of processing are executed.

For example, a programmable logic device (PLD) such as a field programmable gate array (FPGA) and other devices such as an application specific integrated circuit (ASIC) may be used as the controller 11.

The type of the communication terminal 10 is not limited and any device having a communication function, an imaging function, and a sound collection function may be used. For example, any device including a desktop PC, a game console device, a television apparatus, an audio video receiver, various personal digital assistants (PDA) such as a tablet terminal, and the like can be exemplified as well as the above-mentioned laptop PC and smartphone.

Figure 3:
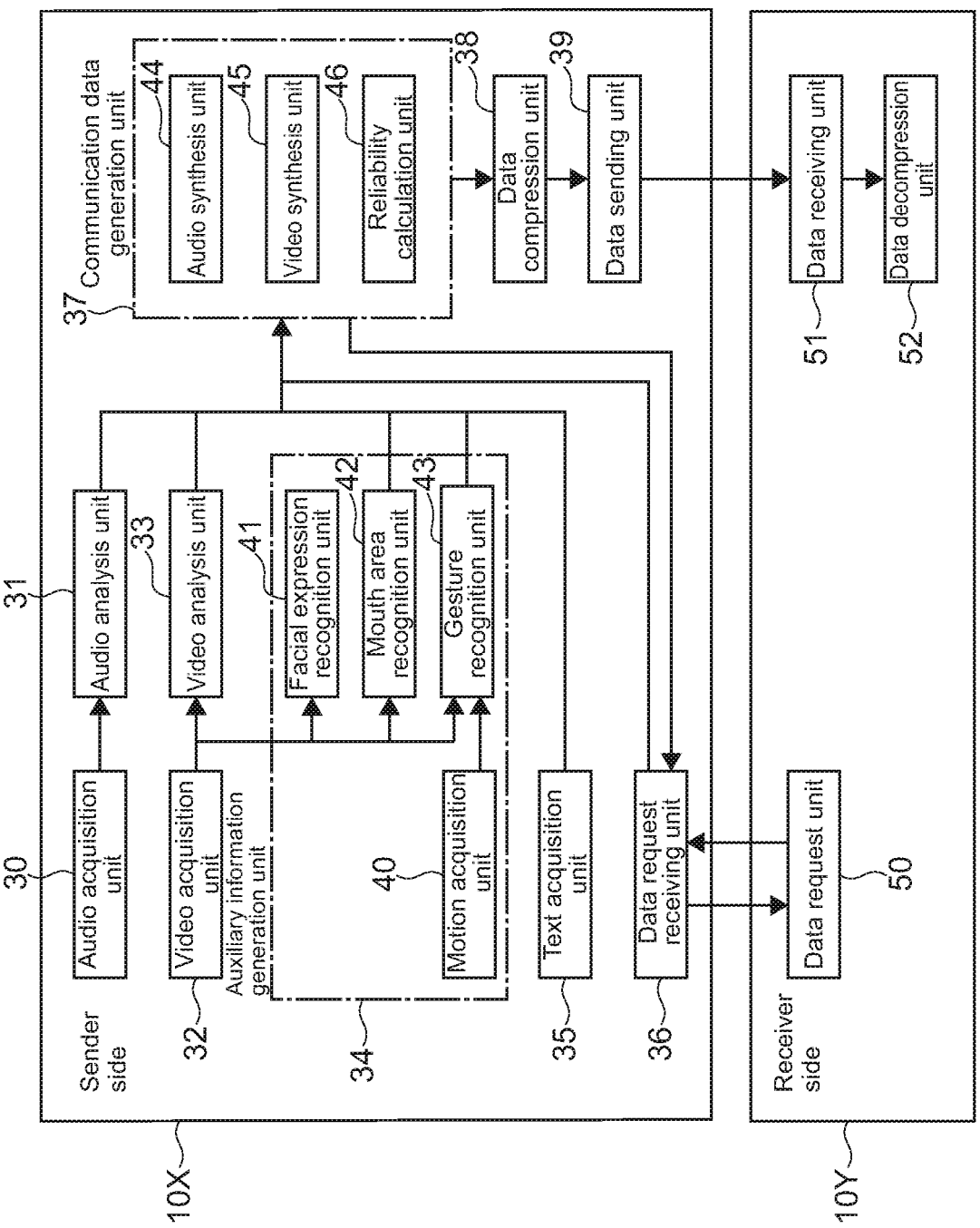
FIG. 3 A block diagram showing a functional configuration example of the communication terminal.

FIG. 3 is a block diagram showing a functional configuration example of the communication terminal 10. Here, a communication terminal 10X on the sender side and a communication terminal 10Y on a receiver side are shown to be distinguished from each other. As a matter of course, when the remote communication is performed, the communication terminals (e.g., the communication terminals 10a and 10b shown in FIG. 1) both function as the sender side and the receiver side.

In this embodiment, by the CPU of the controller 11 executing the program (application) according to this embodiment, the respective functional blocks shown in FIG. 3 are realized and the information processing method according to this embodiment is executed. As a matter of course, in order to realize the respective functional blocks, dedicated hardware such as an integrated circuit (IC) may be used as appropriate.

The communication terminal 10X on the sender side includes an audio acquisition unit 30, an audio analysis unit 31, a video acquisition unit 32, a video analysis unit 33, an auxiliary information generation unit 34, a text acquisition unit 35, a data request receiving unit 36, a communication data generation unit 37, a data compression unit 38, a data transmission unit 39, and an environment information acquisition unit (not shown). The audio acquisition unit 30, the video acquisition unit 32, and the text acquisition unit 35 function as acquisition units in this embodiment.

The audio acquisition unit 30 acquires audio (input information) captured by the microphone 13 and outputs the audio (input information) to the audio analysis unit 31. The audio analysis unit 31 analyzes the acquired audio and determines the presence/absence of the audio of the user 5 and a missing level (audio missing range) thereof. In this embodiment, the audio of the user 5 who uses the communication terminal 10 is input and analyzed by the audio analysis unit 31 in advance. Whether or not the acquired audio includes the audio of the user 5 and the missing level thereof are determined on the basis of the analysis result. It should be noted that any audio analysis technology using machine learning and the like, for example, may be used as the analysis method.

The missing level of the audio is typically determined by using audio of normal conversation as a reference. For example, in a case where conversation of the user 5 is properly acquired, it is determined that the contents of uttered phrases (contents of an uttered sentence) as well as the intonation (how to speak) are both proper and it is not missing. In a case where the contents of the uttered sentence can be grasped while the intonation is missing as compared to the normal conversation, it is determined that the intonation is missing. For example, in a case where utterance or the like in a low voice like a whisper is performed, it can be determined that the intonation is missing.

For example, missing speed, missing pitch, missing volume, and missing modulation can be exemplified as missing intonation. The missing level may be determined for each of those articles or respective missing articles may be collectively determined as the missing intonation.

In a case where even the contents of the uttered sentence cannot be determined, i.e., in a case where the context cannot be understood on the basis of the audio, it is determined that the uttered sentence is missing. Moreover, in a case where not only the context but also even backchannels (short responses) such as Yes/No cannot be grasped, it is determined that the backchannels are missing as a much higher missing level. It should be noted that the method of setting the missing level is not limited and it may be arbitrarily set.

The missing level of the audio, which is determined by the audio analysis unit 31, is output to the communication data generation unit 37 together with the acquired audio of the user 5.

The video acquisition unit 32 acquires video (input information) captured by the camera 14 and outputs the video (input information) to the video analysis unit 33 and the auxiliary information generation unit 34. It should be noted that processing on the video is executed for each frame image. Therefore, hereinafter, the video will be simply referred to as an image in some cases.

The video analysis unit 33 analyzes the acquired image and determines whether or not the user 5 is shown in that image and determines a missing level (image missing range) if it is shown in that image.

In this embodiment, the image of the user 5 who uses the communication terminal 10 is registered in advance. For example, the image of the entire body may be registered or images of respective sites such as the upper half of the body, the lower half of the body, and the face as well as the image of the entire body may be registered. The video analysis unit 33 determines the presence/absence of image capture of the user 5 and a missing level thereof by using any image analysis technology, for example, using machine learning and the like.

Figure 4A:
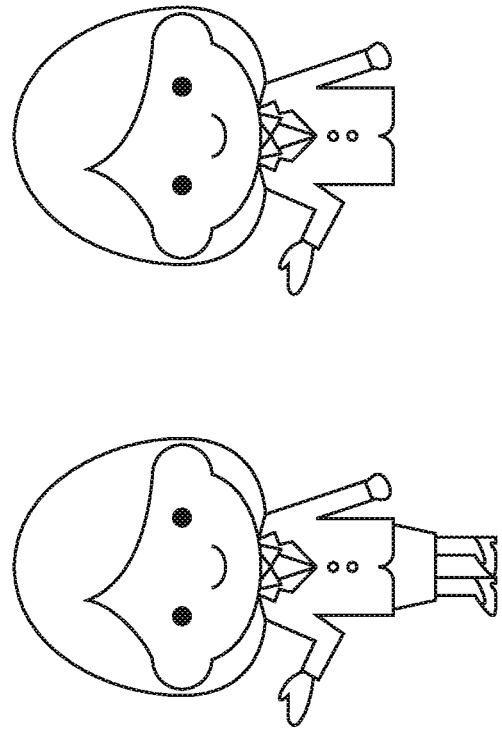
FIGS. 4A, 4B, 4C, and 4D A schematic views for describing an example of a missing level of an image.
Figure 4B:
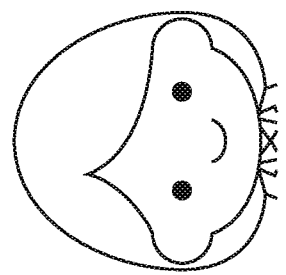

FIGS. 4A, 4B, 4C, and 4D are schematic views for describing an example of the missing level of the image. The missing level increases from the image of FIG. 4A to the image of FIG. 4A. As shown in FIG. 4A, in a case where the entire body of the user 5 is shown in that image, it is determined that it is not missing. As shown in FIG. 4B, in a case where only the upper half of the body is shown in that image, it is determined that the lower half of the body is missing.

Figure 4C:
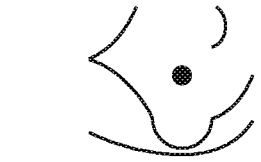
Figure 4D:
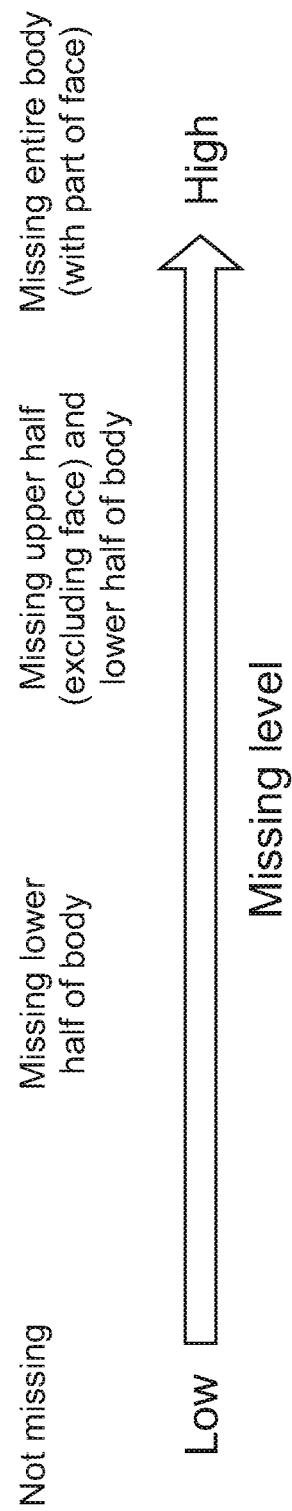

As shown in FIG. 4C, it is determined that the upper half of the body (excluding the face) and the lower half of the body are missing in a case where only the face is shown in that image. As shown in FIG. 4D, in a case where only a part of the face is shown in that image, it is determined that the entire body is missing (with a part of the face). Otherwise, various missing levels, for example, a missing level of the face in a case where only the face is not shown in that image and a missing level of the upper half of the body in a case where only the lower half of the body is shown in that image can be determined.

The determination method for the missing level is not limited and it may be arbitrarily set. Typically, the condition in which a site close to the face which is an important part for recognizing the user 5 is missing is determined as a high missing level. For example, regarding the condition in which the face is missing and the condition in which the lower half of the body is missing, the condition in which the face is missing is determined as a higher missing level. Otherwise, any level determination may be executed on the basis of a missing site, a missing area, and the like.

Further, in the example shown in FIGS. 4A, 4B, 4C, and 4D, the missing level is determined by using an image in which the entire body of the user 5 is shown as a reference. Not limited thereto, the missing level may be determined by using the image of the upper half of the body as a reference. In this case, with respect to the image in which the upper half of the body is shown, it is determined that it is not missing.

The missing level may be determined on the basis of not only whether or not the acquired image is shown in that image but also the state of a site shown in that image and the like. For example, with respect to the face shown in that image, whether or not the facial expression is missing is determined. Alternatively, with respect to the upper half of the body shown in that image, whether or not the gesture (motion) is missing may be determined. It is determined that the facial expression is missing because the face is shown in that image and the facial expression is not changed. It is determined that the gesture is missing because the upper half of the body is shown in that image and it is hardly moved. Such level determination is also possible.

The missing level of the image which is determined by the video analysis unit 33 is output to the communication data generation unit 37 together with the acquired image of the user 5.

The auxiliary information generation unit 34 includes a motion acquisition unit 40, a facial expression recognition unit 41, a mouth area recognition unit 42, and a gesture recognition unit 43. The motion acquisition unit 40 acquires motion information related to the motion of the user 5 on the basis of a detection result of the sensor unit 15. In this embodiment, the motion acquisition unit 40 is included in the acquisition unit and the motion information is included in the input information.

The facial expression recognition unit 41 recognizes the facial expression of the user 5 and generates facial expression information on the basis of the image of the user 5 output from the video acquisition unit 32. Feelings of the user 5, for example, smiling, being angry, being upset, and the like can be detected on the basis of the facial expression information. The facial expression information is output to the communication data generation unit 37 as the auxiliary information. It should be noted that any facial expression recognition technology using machine learning and the like may be used.

The mouth area recognition unit 42 detects a motion of the mouth of the user on the basis of the image of the user 5 output from the video acquisition unit 32 and generates words uttered by the user 5 as lip synchronization (lip sync) information. The lip sync information is output to the communication data generation unit 37 as the auxiliary information. It should be noted that any detection technology utilizing machine learning and the like may be used.

The gesture recognition unit 43 recognizes the gesture of the user 5 on the basis of the image of the user 5 output from the video acquisition unit 32 and the motion information output from the motion acquisition unit 40. For example, a gesture of the head such as nodding and head shaking and the gesture of the hand including the sign language and the like can be recognized. Such gesture information is output to the communication data generation unit 37 as the auxiliary information. It should be noted that any recognition technology utilizing machine learning and the like may be used.

The text acquisition unit 35 acquires text information (phrase information) input via the operation unit 17 including the keyboard, the touch panel, and the like. The acquired text information is output to the communication data generation unit 37. It should be noted that the text information is not limited to a case where it is used as the input information of the user 5 and the text information can also be used as the auxiliary information.

The data request receiving unit 36 receives the request information with respect to the communication data D, which is sent from the communication terminal 10Y on the receiver side via the network 1. In this embodiment, the request information includes the request related to display of the image included in the communication data D and the request related to reproduction of the audio.

The request related to display of the image is a request related to the display level of the image of the user 5, and includes, for example, the presence/absence of display of the user 5, the range (site) displayed, and the like. For example, the request can be performed at various display levels, for example, inclusion of the entire body, the upper half of the body, the lower half of the body, the face, the eyes, the mouth area, inclusion of at least the upper half of the body, inclusion of at least the lower half of the body, inclusion of at least the face, and inclusion of at least the eyes and the mouth area. As a matter of course, the instruction indicating that the image of the user 5 is unnecessary is also included in the request related to display of the image. Otherwise, any request related to the image of the user 5 is included.

The request related to the reproduction of the audio is the request related to the reproduction level of the audio of the user 5, for example. Requesting at various reproduction levels, for example, the audio of the normal conversation, i.e., the audio in which the contents of the uttered sentence and the intonation (the speed, the pitch, the volume, the intonation, and the like) are not missing, the audio with which at least the contents of the uttered sentence can be grasped, the audio in which at least the backchannels can be grasped, and the like, can be performed. As a matter of course, the instruction indicating that the audio is unnecessary is also included in the request related to the reproduction of the audio. Otherwise, any request related to the audio of the user 5 is included.

Further, the request information includes the reliability related to the image included in the communication data D and the reliability related to the audio. The reliability will be described later. The request information received by the data request receiving unit 36 is output to the communication data generation unit 37.

In this embodiment, the request information output unit is realized with at least one of the data request receiving unit 36 or a data request unit 50 to be described later. The request information output unit is capable of outputting the updated request information to the communication data generation unit 37. Only the data request receiving unit 36 on the sender side or only the data request unit 50 on the receiver side may function as the request information output unit. Alternatively, the request information output unit may be realized by cooperation of the data request receiving unit 36 on the sender side and the data request unit 50 on the receiver side. It should be noted that updating of the request information will be described later.

It should be noted that in this embodiment, environment information including the location of the user 5, the time, the specifications of the communication terminal 10, the states of the user 5 and the communication terminal 10, and the like, which is generated by the environment information acquisition unit the illustration of which is omitted, is sent to the communication terminal 10Y on the sender side via the data request receiving unit 36.

The communication data generation unit 37 generates communication data D of the user 5 on the basis of the data and the like received from the respective blocks. Typically, the communication data D is generated so as to satisfy the request related to display of the image and the request related to the reproduction of the audio, which are included in the request information received from the communication terminal 10Y on the receiver side. On the other hand, in a case where the request cannot be satisfied, for example, the communication data D close to a request level thereof is generated. In this embodiment, the communication data generation unit 37 functions as the generation control unit.

As shown in FIG. 3, the communication data generation unit 37 includes an audio synthesis unit 44, a video synthesis unit 45, and a reliability calculation unit 46.

The audio synthesis unit 44 generates audio of the user 5 included in the communication data D on the basis of the audio of the user 5 output from the audio analysis unit 31 and the missing level of the audio and the request related to the reproduction of the audio output from the data request receiving unit 36. At that time, as necessary, the audio of the user 5 is complemented by using the auxiliary information output from the auxiliary information generation unit 34 and the like.

For example, in a case where the missing level of the acquired audio of the user 5 is low and a requested reproduction level of the audio is satisfied, the acquired audio of the user 5 is generated as the communication data D as it is. For example, it is a case where the request of the audio is accepted or the like, at least the contents of the uttered sentence can be grasped with respect to the audio in which the intonation is missing while the contents of the uttered sentence can be grasped.

On the other hand, in a case where the missing level of the acquired audio of the user 5 is high and a requested reproduction level of the audio is not satisfied, the audio of the user 5 is complemented on the basis of the auxiliary information.

FIG. 5 is a table showing an example of a range complementable on the basis of auxiliary information. For example, a feeling of the user 5 can be detected on the basis of the facial expression information. Therefore, the intonation of the audio is complementable to some degree. For example, when being angry, the speed and the pitch are increased and the intonation is strengthened. When being sad, the speed, the pitch, and the volume are increased, for example. On the other hand, it is difficult to complement the contents of the uttered sentence on the basis of the detected feeling and the backchannels are complementable in some cases.

The contents of the uttered sentence including the backchannels can be sufficiently complemented on the basis of the lip sync information. Further, it is also possible to read the speed and the like and the intonation is complementable in some cases.

The backchannels can be sufficiently complemented on the basis of the gesture information. The intonation and the contents of the uttered sentence are complementable in some cases. It should be noted that in a case where the sign language is performed, the contents of the uttered sentence can also be sufficiently complemented.

The contents of the uttered sentence including the backchannels can be substantially completely complemented on the basis of the text information. The intonation is complementable in some cases. By utilizing information regarding a key touch pressure and the like as the auxiliary information, a complementation rate can be enhanced.

The audio synthesis unit 44 complements the input audio of the user 5 on the basis of various types of auxiliary information. Typically, the complemented audio data is synthesized by using any audio synthesis technology. With this configuration, for example, audio to which the intonation is added and audio expressed by the contents of the uttered sentence can be generated as the communication data D. It should be noted that the audio data synthesis is not limited and any complementation method may be executed.

The video synthesis unit 45 generates an image of the user 5, which is included in the communication data D, on the basis of the image of the user 5 and the missing level of the image output from the video analysis unit 33 and the request related to display of the image output from the data request receiving unit 36. As necessary, the image of the user 5 is complemented by using the auxiliary information output from the auxiliary information generation unit 34 and the like.

For example, in a case where the missing level of the image of the acquired user 5 is low and a requested display level of the image is satisfied, the acquired image of the user 5 is generated as the communication data D as it is. For example, it is a case where, with respect to the image in which the lower half of the body is missing, display of the image including at least the face is requested, or the like.

In a case where the missing level of the image of the acquired user 5 is high and a requested display level of the image is not satisfied, the auxiliary information is complemented on the basis of the image of the user 5. For example, a missing portion is complemented by combining an image of the user 5 which is registered in advance. Alternatively, a 3D model (avatar) of a human body and the like may be combined.

In a case where the entire body or a part of the body is missing and a missing portion thereof is to be complemented, the motion information, the gesture information, and the like are utilized as appropriate. Further, for example, in a case where the entire face or a part of the face is missing and the image of the face is to be complemented, a result of the text information and the audio data (including the complemented audio data) may be utilized and the facial expression, the motion of the mouth, and the like may be synthesized. In a case where the upper half of the body is to be complemented, it is also possible to synthesize the gesture. The synthesis of those facial expression and gesture are executed also in a case where the missing facial expression and gesture are to be complemented.

The reliability calculation unit 46 analyzes and calculates the reliability of the communication data D (reliability of the output information). That is, reliability related to each of the image and the audio included in the communication data D is calculated. The reliability calculation unit 46 corresponds to a calculation unit in this embodiment.

In this embodiment, the reliability is generated as indication (parameter) expressing deviation from input image and audio (hereinafter, referred to as original data) of the user 5. For example, in a case where the original data obtained by the audio acquisition unit 30 is not processed and is used as the communication data D, the reliability is 100%. In a case where complementation is executed on the basis of the auxiliary information, the reliability is 100% or less.

For example, the reliability is calculated on the basis of the missing level of the original data, the missing contents, the recognition accuracy of each piece of the auxiliary information, the complementation possibility (complementation rate) shown in FIG. 5, consistency of previous and following phrases of the generated audio, and the like. For example, it is assumed that the audio including the contents of the uttered sentence and the intonation is requested as the reproduction level of the audio. If the missing level of the original data is a level at which the contents of the uttered sentence can be grasped while the intonation is missing, the reliability of the complemented audio is calculated as being relatively high. On the other hand, in a case of a missing level at which only the backchannels can be grasped, the reliability of the audio is calculated as being low.

Further, referring to FIG. 5, in a case where the intonation is complemented, the reliability of complementation based on the facial expression information is calculated as being relatively high. The reliability of the complementation based on the lip sync information, the gesture information, and the text information is calculated as being relatively low.

In a case where the contents of the uttered sentence are complemented, the reliability of complementation based on the lip sync information and the text information is very high. The reliability of complementation based on the facial expression information is substantially zero. In a case where the gesture information is used, the reliability is very high in a case of the sign language and the reliability is low in other cases.

In a case of complementation of the backchannels, the reliability is very high in a case where the lip sync information, the gesture information, and the text information are used. In a case where the facial expression information is used, the reliability is low. That is, the complementation possibility (complementation rate) and the reliability are substantially correlated to each other. By setting weighting corresponding to the complementation possibility with respect to each piece of the auxiliary information, the reliability according to complementation based on multiple pieces of auxiliary information can be calculated.

Also regarding the image, in a case where the original data obtained by the video acquisition unit 32 is not processed and is used as the communication data D, the reliability is 100%. In a case where complementation is executed on the basis of the auxiliary information, the reliability is 100% or less.

For example, the reliability is calculated on the basis of the missing level of the original data, the missing site and size, the recognition accuracy of each piece of the auxiliary information, and the like. For example, referring to FIGS. 4A, 4B, 4C, and 4D, it is assumed that the image of the entire body is requested as the display level of the image (FIG. 4A). In a case where complementation is executed on the basis of the image of the missing level in B to D of FIGS. 4B, 4C, and 4D, the reliability becomes lower in a direction of from Picture B to Picture D.

Further, the reliability in a case where complementation of the face is performed is lower than the reliability in a case where complementation of the other sites is performed. It is because the deviation from the original data is more easily recognized in a case where the face is complemented. For example, by setting weighting with respect to the missing site (site which is a target to be complemented), the reliability in a case where multiple sites are complemented can be calculated. Further, brightness (luminance), the hue, and the like of the image to be generated may be used for calculation of the reliability.

The calculation method for the reliability of the communication data D is not limited to the above-mentioned one and may be arbitrarily set. A calculation method based on any parameter, such as the missing level of the original data, each request level included in the request information, and a specific method for complementation processing of the audio and the image may be employed.

The data compression unit 38 compresses transmission data including the communication data D and reliability thereof. The data transmission unit 39 sends the compressed transmission data to the communication terminal 10Y on the receiver side via the communication unit 20 shown in FIG. 2. The reliability sending unit according to this embodiment is realized by the data compression unit 38 and the data sending unit 39.

It should be noted that in a case where the communication data D satisfying each request included in the request information cannot be generated, in a case where the reliability is calculated as being very low, or the like, the user 5 may be informed of that fact. Then, the user 5 may be informed of an instruction for causing image capture and audio input to be properly performed, an instruction for inputting the auxiliary information, and the like via a GUI or audio.

The communication terminal 10Y on the receiver side includes the data request unit 50, a data receiving unit 51, and a data decompression unit 52. The data receiving unit 51 receives the communication data D compressed and sent by the communication terminal 10X on the sender side. The data decompression unit 52 decompresses the compressed communication data D. An arbitrary data transmission protocol or any video/audio decoder may be used.

The data request unit 50 generates request information related to the communication data D and sends the communication terminal 10X on the sender side via the communication unit 20.

As described above, the request information includes the reliability related to the image and the reliability related to the audio which are included in the communication data D. For example, the contents of the display level of the image and reliability thereof and the contents of the reproduction level of the audio and reliability thereof are generated as the request information. For example, a request to provide the image of the upper half of the body with the reliability of 80% or to provide the audio with the intonation with the reliability of 80% can be sent. As a matter of course, the reliability may be omitted.

The request information is typically generated on the basis of the instruction input by the user 5 on the receiver side. For example, GUIs and the like for inputting the display level of the image and the reproduction level of the audio may be displayed on the display unit 16 as appropriate.

In this embodiment, environment information including the location of the user, the time, the specifications of the communication terminal, the states of the user and the communication terminal 10, and the like is sent from the data request receiving unit 36 on the sender side to the data request unit 50 on the receiver side. Referring to the sent environment information as appropriate, the request information may be generated.

FIG. 6 is a table for describing relevance of the environment information to a generatable level of the communication data D. For example, as shown in FIG. 6, a generatable level (generatable range) range of the communication data D can be estimated in accordance with a location of the user on the sender side, a time zone, a position at which the communication terminal 10 is placed, and the like. That is, a displayable level of the image of the user 5 and the reproducible level of the audio of the user 5 can be estimated. It should be noted that in the figure, the generatable level is described as "Allowable presentation range".

In a case where the communication terminal 10 is placed on a desk in a house, it is easy to acquire images of the face and the upper half of the body and send the images as the communication data D irrespective of the time zone. Regarding the lower half of the body, it may be difficult to acquire an image thereof in a manner that depends on the position of the communication terminal 10. With respect to the audio, it is possible to freely speak. Therefore, the audio properly including all of the intonation, the uttered sentence, and the backchannels can be acquired and can be easily sent as the communication data D.

In a case where the communication terminal 10 is placed on a wall or desk of a conference room during conference, the images of the upper half of the body and the face are sufficiently OK and the image of the lower half of the body cannot be substantially provided irrespective of the time. With respect to the audio, the intonation, the uttered sentence, and the backchannels are all OK.

In a case of getting on the train and holding the communication terminal 10 in hand, there is merely a case where the images of the upper half of the body and the face can be captured, and the image of the lower half of the body cannot be substantially provided. With respect to the audio, it is difficult to speak. Therefore, the intonation, the uttered sentence, and the backchannels are all impossible.

In a case of getting on a car and setting the communication terminal 10 on a hood or a center console, when the time zone is daytime, the image of the face is OK, the image of the upper half of the body is OK in some cases, and the image of the lower half of the body is impossible. With respect to the audio, it is possible to freely speak. Therefore, the intonation, the uttered sentence, and the backchannels are all OK. When the time zone is night, the images are all impossible because it is dark.

In a case where the communication terminal 10 is placed on a desk (table) in a plane, the image of the face is OK, the image of the upper half of the body is OK in some cases, and the image of the lower half of the body is impossible. With respect to the audio, it is merely possible to speak in a low voice and further, voices of other passengers and sounds of the engine and the like are also mixed. Therefore, the backchannels are OK but the intonation and the contents of the uttered sentence are difficult in some cases.

In a case where the communication terminal 10 is placed on the desk of the library, the images of the face and the upper half of the body are OK and the image of the lower half of the body is OK in some cases. With respect to the audio, if it is possible to speak in a low voice, it is considered that the backchannels and the uttered sentence are OK but the intonation is difficult.

In a case of holding the communication terminal 10 in hand at a live show venue such as a concert, the image of the face is OK, the image of the upper half of the body is OK in some cases, the image of the lower half of the body is impossible. With respect to the audio, by speaking loud, the intonation and the uttered sentence are OK and voices at the level of the backchannels are drowned in some cases.

In a case where the communication terminal 10 is placed on a table in a restaurant, the images of the face and the upper half of the body are OK and the image of the lower half of the body is impossible. Further, the backchannels and the uttered sentence are OK and the intonation is impossible. In a case where the communication terminal 10 in hand is utilized during diving under water, images are merely slightly difficult and all types of audio are impossible.

As a matter of course, a realization range of the generatable level with respect to the environment information is not limited to that shown in the table of FIG. 6 and may be set as appropriate. For example, a realizable range of an image displayable level and an audio reproducible level may be defined in more detail on the basis of more detailed information including the specifications of the communication terminal 10 and a seat position in each location, and the like. Further, the user may customize the generatable level as appropriate. Further, the "level" is not limited to those stepwisely defined with numerical values such as 1 and 2. For example, the "level" may be defined with abstract degrees such as being sufficient/insufficient. In the present disclosure, it is sufficient that the definition of the "level" is arbitrary, and the same applies to the above-mentioned missing level.

In any case, by referring to the environment information on the sender side, the generatable level can be estimated and the request information can be properly generated (and updated). For example, the user 5 is notified of the information regarding the estimated generatable level via a UI and the like. The user 5 requests the communication data D in the range generatable by the communication partner. As a matter of course, it is also possible to stubbornly request the communication data D at the level estimated as being not generatable. Further, on the basis of the estimated generatable level, optimal request information may be automatically generated.

It may be estimated together with the reliability on the basis of the environment information. For example, the communication partner is currently in flight. Therefore, information indicating that the image of the face is generatable with the reliability of 90%, the image of the upper half of the body is generatable with the reliability of 50%, and the image of the lower half of the body is generatable with the reliability of 10% may be estimated. With this configuration, it is possible to accurately generate proper request information.

It should be noted that the generatable level of the communication data D and reliability thereof may be estimated by an estimation unit (not shown) of the communication terminal 10X on the sender side on the basis of the environment information. Then, the estimation result may be sent by the communication unit 20 that functions as the level sending unit to the communication terminal 10Y on the receiver side. That is, estimation processing based on the environment information may be executed on either the receiver side or the sender side. In either case, proper request information may be accurately generatable.

[Remote Communication Method]

Figure 7:
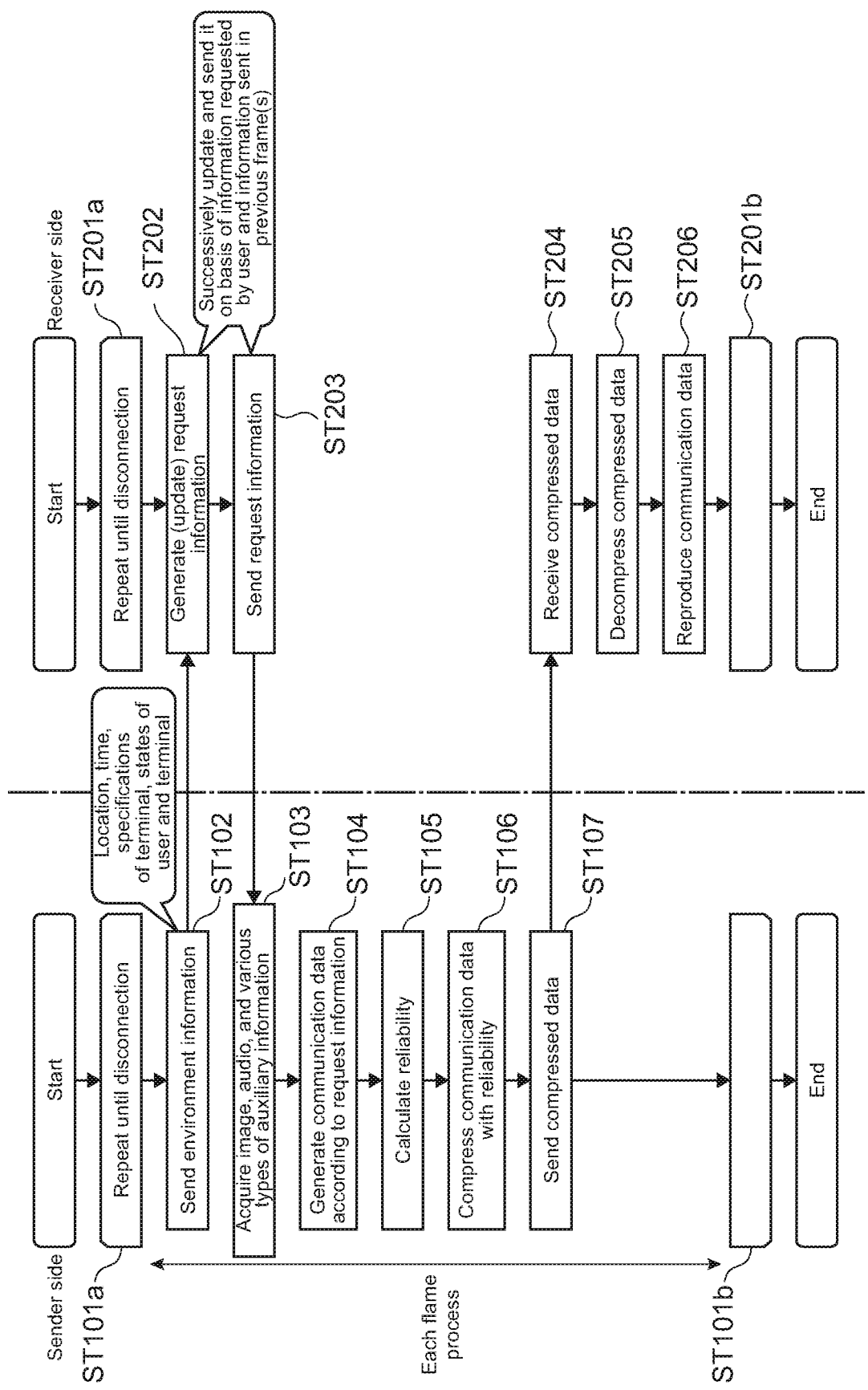
FIG. 7 A flowchart showing an example of a processing flow in each communication terminal.

FIG. 7 is a flowchart showing an example of a processing flow in each of the communication terminals 10X and 10Y for realizing the remote communication according to the present technology. In the communication terminal 10X on the sender side, the steps of Steps 101a to 101b are repeatedly executed for each of frames that constitute the video. In the communication terminal 10Y on the receiver side, the steps of Steps 201a to 201b are repeatedly executed for each of frames. It should be noted that the processing is repeated until mutual connection between the respective communication terminals 10X and 10Y is disconnected.

In this embodiment, using the communication terminal 10 owned by each user 5, the application for this remote communication is started. For example, information (icon and the like) regarding other users 5 with whom communicable can be performed is displayed in a list and the communication starts by selecting a communication partner in that list. As a matter of course, the process of remote communication start is not limited and any method may be employed.

FIGS. 8 to 11 are schematic views showing a specific example of remote communication. In those figures, remote communication between the user 5b who mainly works outside an office and the user 5a who is his business partner is shown as an example. Assuming that the user 5b who is working outside the office is on the sender side and the user 5a who is the business partner is on the receiver side, the flowchart of FIG. 7 will be described with reference to FIGS. 8 to 11 as appropriate.

First of all, environment information is sent from the communication terminal 10b on the sender side to the communication terminal 10a on the receiver side (Step 102). In the example shown in FIG. 8, the following environment information is sent as information in an initial state.

Location . . . coffee shop
Time . . . morning
Specifications of communication terminal . . . laptop PC
State of user . . . sitting
State of communication terminal . . . placed on desk Request information is generated by the communication terminal 10a which has received the environment information. That is, request information including a display level of the image and reliability thereof and a reproduction level of the audio and reliability thereof is generated (Step 202). The generated request information is sent to the communication terminal 10b on the sender side (Step 203). In the example shown in FIG. 8, a request of the image (reliability: 100%) of the upper half of the body (including the face) and the audio (reliability: 100%) with the intonation is generated and sent as first request information.

At the communication terminal 10b on the sender side, the image and the audio of the user 5b and the various types of auxiliary information are acquired (Step 103). Then, communication data D according to the request information is generated and further, reliability of the communication data D is calculated (Steps 104 and 105). The generated communication data D is compressed with the reliability and is sent to the communication terminal 10a on the receiver side (Steps 106 and 107).

Figure 8:
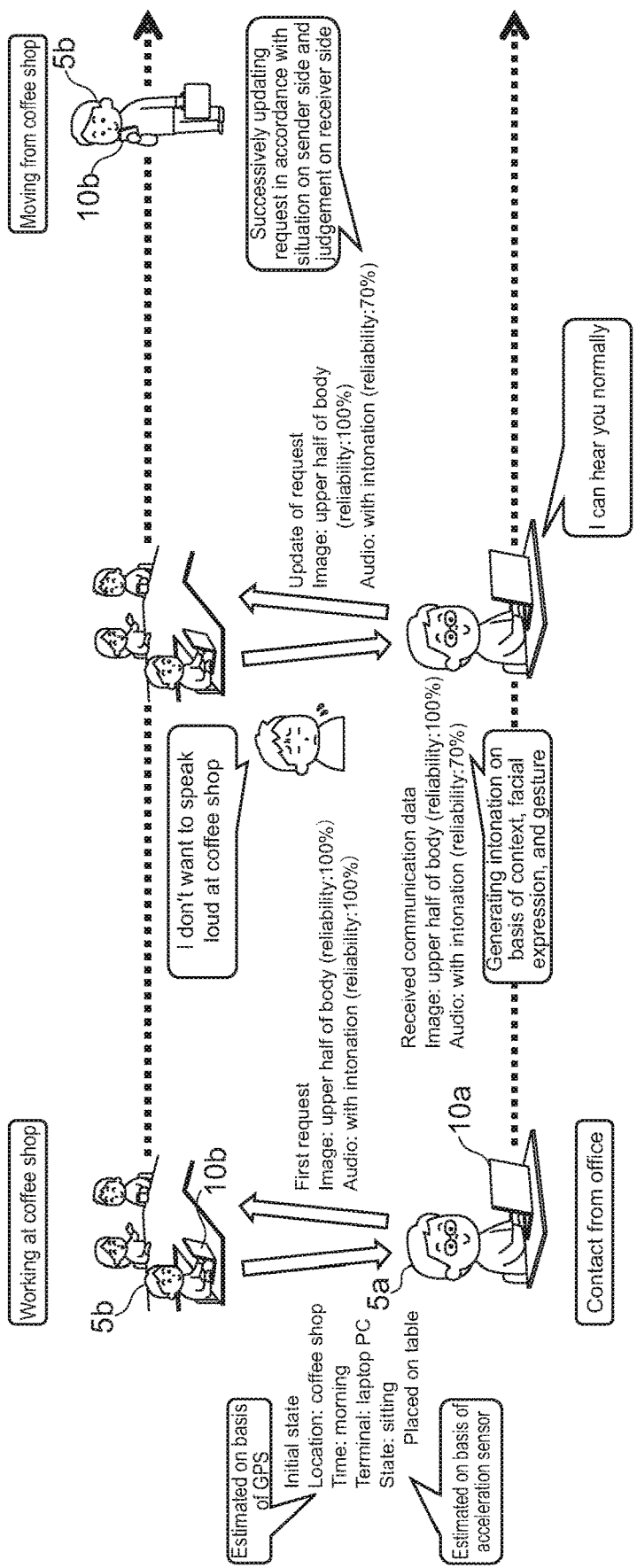
FIG. 8 A schematic view showing a specific example of remote communication.

In the example shown in FIG. 8, an image of the upper half of the body of the user 5b can be sufficiently captured and the communication data D of the image (reliability: 100%) of the upper half of the body (including the face) is generatable as requested. On the other hand, the user 5b does not want to speak louder than surrounding sounds and the like at the coffee shop. Therefore, with respect to the audio, the communication terminal 10b generates audio (reliability: 70%) with intonation complemented on the basis of the auxiliary information and the like.

The communication terminal 10a on the receiver side decompresses the received compressed data and reproduces the communication data D related to the user 5b (Steps 204, 205, and 206). That is, the image of the upper half of the body of the user 5b (including the face) is displayed on the display unit 16 and the audio of the user 5b with intonation is output through the speaker. It should be noted that at this time, the user 5a is notified of the reliability of 100% of the image and the reliability of 70% of the audio via a UI and the like.

Returning to Step 102, the environment information is sent. It should be noted that in a case where the location of the user 5b and the like does not change, the same environment information is generated by the communication terminal 10b. In this case, the sending step of the environment information may be omitted. In the example shown in FIG. 8, it is assumed that the user 5b is under the same environment.

In Step 202, the request information is updated. For example, the request information is updated on the basis of the contents of the currently requested request information, the contents of the communication data D sent in previous frame(s), and reliability thereof. That update is executed on the basis of an instruction or the like of the user 5a who is performing communication, for example. As a matter of course, the update may be automatically executed.

In the example shown in FIG. 8, the user 5a does not particularly feel the audio with intonation with the reliability of 70% discomfort. Therefore, with respect to the audio, the request information is updated from the audio (reliability: 100%) with the intonation to the audio (reliability: 70%) with intonation. In this manner, the request information is successively updated in accordance with the state and the situation on the sender side and judgement on the receiver side. As a result, favorable remote communication is realized with very high quality.

It should be noted that Steps 201, 103 to 107, and 204 to 206 are similar to the previous steps by the time the communication data D is sent after the updated request information is sent. Hereinafter, descriptions of steps repeated with the same processing contents will be omitted in some cases.

Next, it is assumed that the user 5b on the sender side moved from the coffee shop by switching the communication terminal 10b to the smartphone. The method of switching the communication terminal 10b is not limited and any method may be used.

Environment information is generated by the communication terminal 10b carried by the user 5b who moved from the coffee shop and is sent to the communication terminal 10a on the receiver side (Step 102). In the example shown in FIG. 9, the following environment information is sent as information regarding the updated state and situation.

Location . . . outdoor (no particular locations are detected)
Time . . . afternoon
Specifications of communication terminal . . . smartphone
State of user . . . standing
State of communication terminal . . . holding in hand The request information is updated by the communication terminal 10a which has received the updated environment information (Step 202). In the example shown in FIG. 9, request information including a request of the image of the face (reliability: 50%) and the audio (reliability: 100%) with the intonation is generated.

At the communication terminal 10b on the sender side, the image and the audio of the user 5b and the various types of auxiliary information are acquired (Step 103). Then, the communication data D according to the request information is generated and further, the reliability of the communication data D is calculated (Steps 104 and 105).

Figure 9:
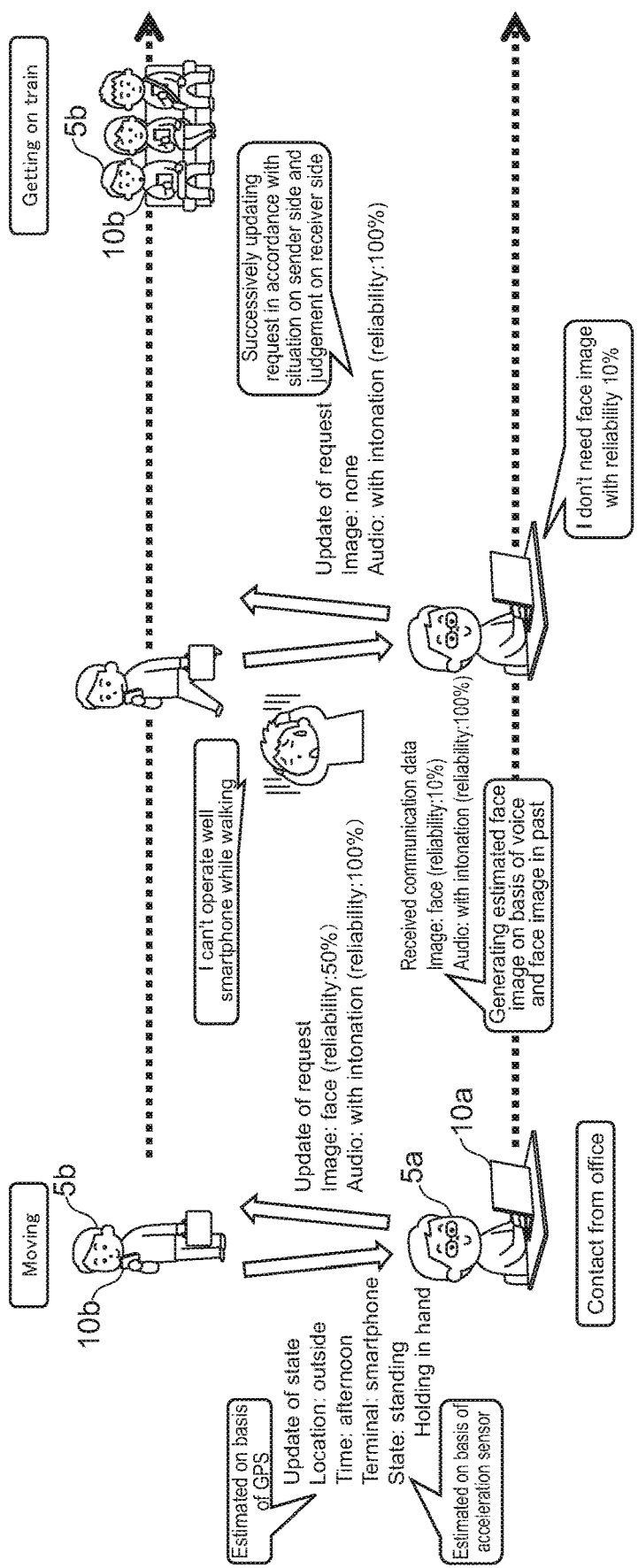
FIG. 9 A schematic view showing a specific example of remote communication.

In the example shown in FIG. 9, it is dangerous to use a smartphone while walking and it is difficult to constantly photograph the face. Therefore, a face image complemented on the basis of the auxiliary information and the like is generated and reliability thereof is 10%. On the other hand, the audio can be sufficiently input even while walking. Therefore, the communication data D of the audio (reliability: 100%) with the intonation is generatable as requested.

The request information is updated by the communication terminal 10a on the receiver side which has received the generated communication data D (Step 202). In the example shown in FIG. 9, it is judged that the image of the face with the reliability of 10% is unnecessary and update to a request indicating that the image is unnecessary is performed.

It should be noted that in a case where the reliability is lower than a predetermined threshold as a result of complementation, it may be possible to perform setting and the like indicating that it cannot be sent as the communication data D. Alternatively, an instruction indicating that the communication data D with the reliability equal to or lower than the threshold is unnecessary may be included in the request information.

Next, it is assumed that the user 5b on the sender side is in the train. Environment information is generated by the communication terminal 10b possessed by the user 5b who is in the train and is sent to the communication terminal 10a on the receiver side (Step 102). In the example shown in FIG. 10, the following environment information is sent as information regarding the updated state and situation.

Location . . . train
Time . . . afternoon
Specifications of communication terminal . . . smartphone
State of user . . . sitting
State of communication terminal . . . holding in hand The request information is updated by the communication terminal 10a which has received the updated environment information (Step 202). In the example shown in FIG. 10, request information including a request of the image of the face (reliability: 80%) and the backchannels (reliability: 100%) is generated.

At the communication terminal 10b on the sender side, the image and the audio of the user 5b and the various types of auxiliary information are acquired (Step 103). Then, the communication data D according to the request information is generated and further, the reliability of the communication data D is calculated (Steps 104 and 105).

Figure 10:
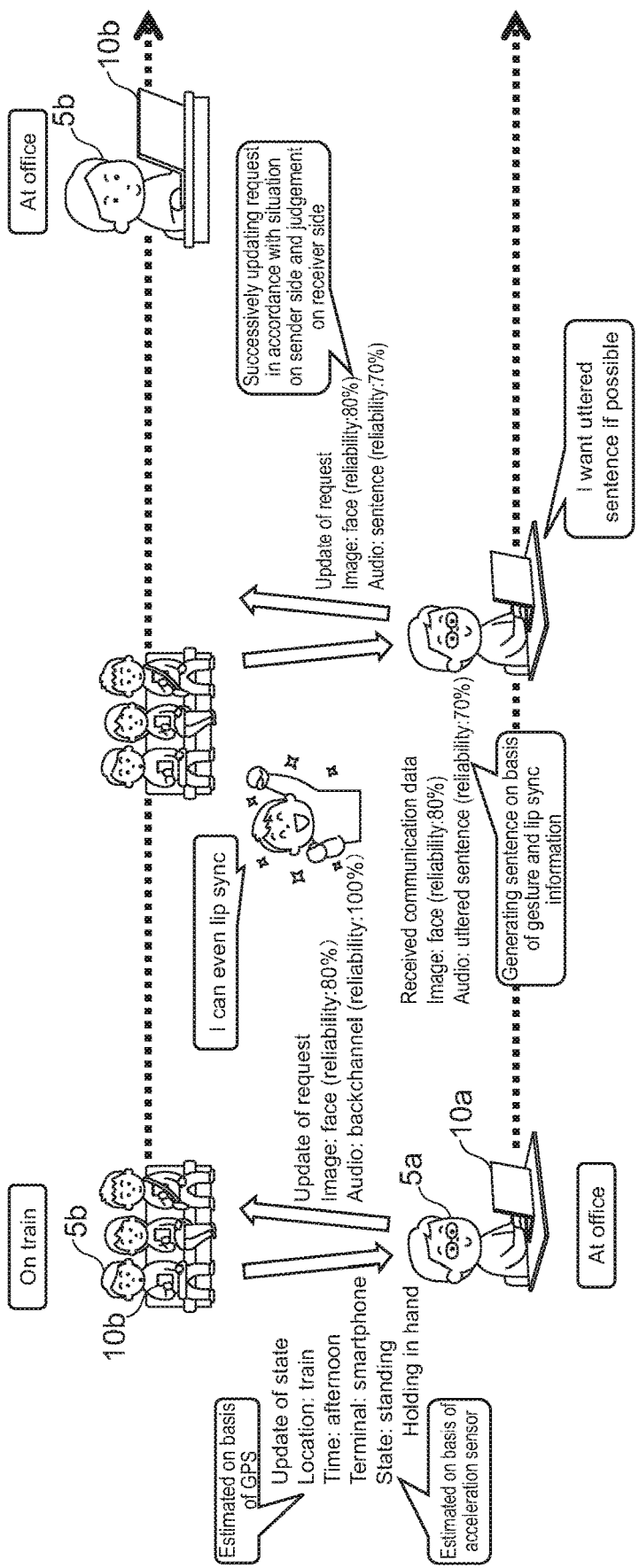
FIG. 10 A schematic view showing a specific example of remote communication.

In the example shown in FIG. 10, an image of his own face can captured even in the train. Therefore, the communication data D of the image of the face (reliability: 100%) is generatable as requested. With respect to the audio, he can speak in a low voice. Therefore, it is determined that the backchannels can be input.

In addition to it, in a case of being in a train, it is determined that a much higher reproduction level of the audio is possible in the train. That is, on the basis of the lip sync information, it is determined that the uttered sentence is also generatable and an uttered sentence (frequency is 70%) based on the lip sync information is generated.

A determination as to whether or not much higher level communication data D is generatable may be performed with respect to the request of each of the display level of the image and the reproduction level of the audio in this manner. If such determination is positive, the communication data D at a higher level than the request level may be generated. It should be noted that at that time, whether or not the reliability is higher than the threshold may be determined. If the reliability is lower than the threshold, the communication data D at the higher level is not generated and the communication data D as requested is generated.

The request information is updated by the communication terminal 10a on the receiver side which has received the generated communication data D (Step 202). In the example shown in FIG. 10, it is determined that it is sufficient even with the uttered sentence with the reliability of 70%, the request about the audio is updated to the uttered sentence (reliability: 70%).

Next, it is assumed that the user 5b on the sender side returns to his office and switches the communication terminal 10b to the laptop PC placed on the desk. Environment information is generated by the communication terminal 10b (laptop PC) and is sent to the communication terminal 10a on the receiver side (Step 102). In the example shown in t, the following environment information is sent as information regarding the updated state and situation.

Location . . . office
Time . . . evening
Specifications of communication terminal . . . laptop PC
State of user . . . sitting
State of communication terminal . . . placed on desk The request information is updated by the communication terminal 10a which has received the updated environment information (Step 202). In the example shown in FIG. 11, the request of the image (reliability: 100%) of the upper half of the body (including the face) (with gestures) and the audio (reliability: 100%) with the intonation is generated and sent.

At the communication terminal 10b on the sender side, the image and the audio of the user 5b and the various types of auxiliary information are acquired (Step 103). Then, the communication data D according to the request information is generated and further, the reliability of the communication data D is calculated (Steps 104 and 105).

Figure 11:
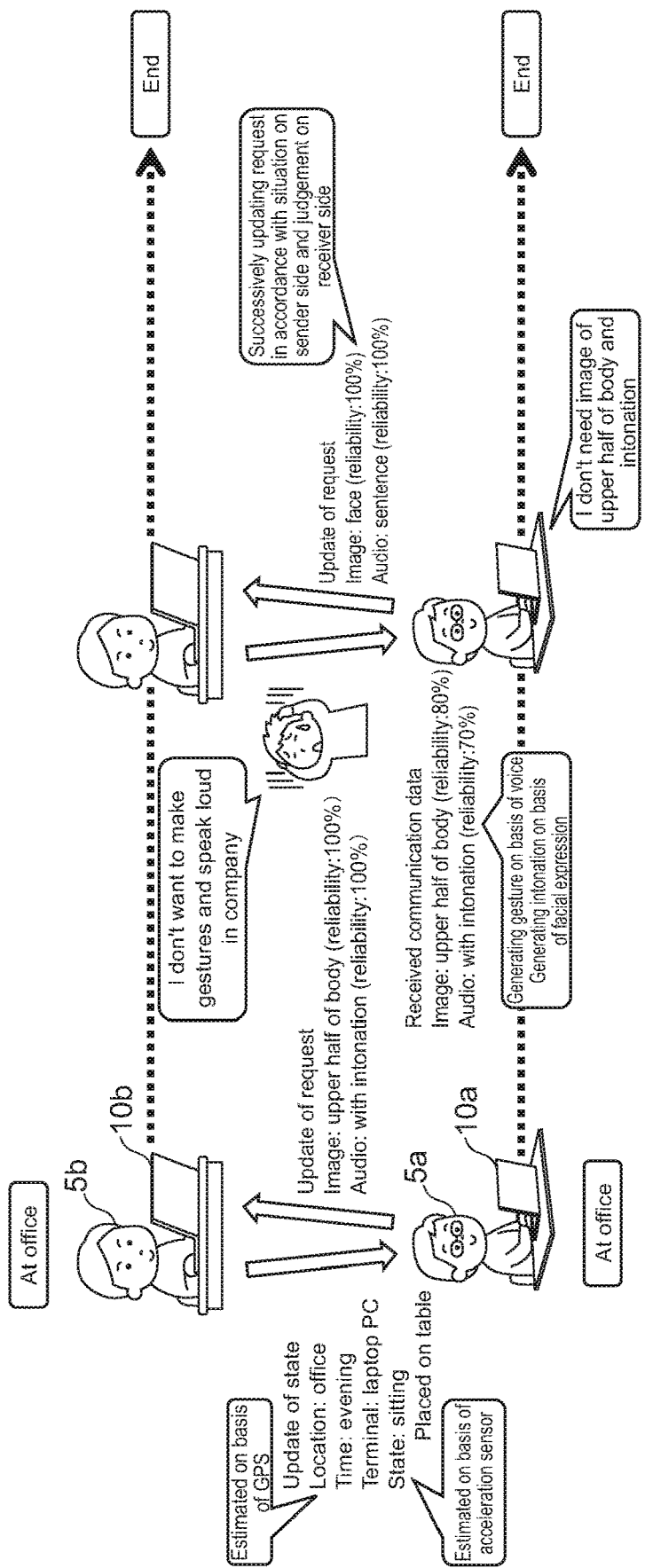
FIG. 11 A schematic view showing a specific example of remote communication.

In the example shown in FIG. 11, it is difficult to speak loud with big gestures, and the image (reliability: 80%) of the complemented upper half of the body (including the face) (with gestures) and the communication data D of the audio (reliability: 70%) with intonation are generated on the basis of the auxiliary information and the like.

The request information is updated by the communication terminal 10a on the receiver side which has received the generated communication data D (Step 202). In the example shown in FIG. 11, considering that the reliability of 100% is important, it is updated to the request of the image of the face (reliability: 100%), not the upper half of the body, and the uttered sentence (reliability: 100%) with not intonation.

As described above, in the communication system according to this embodiment, generation of the communication data D is controlled on the basis of the image and the audio which are the input information and the request information related to the communication data D. With this configuration, for example, it is possible to mutually generate the communication data D according to the request and the like from the communication partner and favorable communication can be performed.

That is, between the data request unit 50 and the data request receiving unit 36, negotiation regarding the communication data D thereof can be performed. With this configuration, the generation level and the like of the communication data D can be adjusted in units of frames in accordance with the environment in which the user 5 is located, the specifications of the communication terminal 10, and the like. Further, with respect to the request related to the communication data D, in a case where the image and the audio of the user 5 are missing, complementation is executed as appropriate by using the auxiliary information and the like and reliability thereof is calculated. With this configuration, smooth remote communication is realized with very high quality.

For example, it is also possible to urge the user 5 on the sender side of the communication data D to increase the reliability, to cancel communication with the communication data D with lower reliability, and the like. Further, in a state in which the environment, the communication condition, or the like is bad, the request level thereof can also be satisfactorily lowered by negotiation, and remote communication with reduced stress can also be realized.

OTHER EMBODIMENTS

The present technology is not limited to the above-mentioned embodiment and various other embodiments can be realized.

Hereinabove, the information regarding the generatable level estimated on the basis of the environment information or the environment information is sent to the communication terminal of the communication partner. Not limited thereto, the request information sent from the communication partner may be compared to the generatable level estimated by the user on the sender side and the comparison result may be sent to the communication partner. For example, notification information indicating that it is difficult to generate the communication data as requested or notification information indicating reliability when the communication data is generated is sent. Alternatively, the notification information to prompt reconsideration of the request information may be sent. Such negotiation can also be performed and is very effective.

A reference state of the generation level of the communication data may be set by the communication terminal on the sender side on the basis of the environment information and the like. That is, the sender side may be able to set what kind of communication data is to be generated. In this case, the information regarding the reference state includes the request information according to the present technology.

On the sender side and the receiver side, the generation level of the communication data may be fixed. For example, in a case where the both sides constantly utilize this communication system under the same environment and the like, generatable communication data is not substantially changed. Therefore, by fixing the generation level of the communication data desired by the both sides, the processing load can be reduced and an improvement in processing speed can be achieved. It should be noted that fixing the generation level corresponds to fixing the request level and the communication data is still generated on the basis of the request information.

Hereinabove, the one-to-one communication mode assuming that the communication terminal on the receiver side is the first communication terminal and the communication terminal on the sender side is the second communication terminal has been shown as an example. The communication mode is not limited. The present technology is applicable also in a case of one to N (e.g., assuming a remote lecture or the like) or N to N (e.g., assuming a conference or the like), for example. The request information can be sent to multiple communication partners and further, the communication data according to the request can be generated with respect to each of the multiple communication partners. As a matter of course, it is also possible to generate communication data in accordance with request information having a highest request level and send to all the communication partners.

In a case of starting communication with multiple users, when users participate a particular location, for example, a chat room or a virtual conference room and two or more users assemble, the communication starts. As a matter of course, another start method may be employed.

Hereinabove, the output information is generated on the basis of the input information including the image and the audio of the user. Not limited thereto, the present technology is applicable in a case where the remote communication using only the image and the remote communication using only the audio are executed.

Hereinabove, as the input information, the image of the first user, which is captured by the camera, and the audio of the first user, which is captured by the microphone, have been exemplified. Not limited thereto, the image and the audio of the first user generated by another system and the like may be used as the input information. For example, in a case where audio is synthesized and output by an assist system and the like used by a physically handicapped person on the basis of the gaze, the motion, and the like of the user and the like, this communication system can also be utilized by using the output audio as the audio of the first user according to the present technology. In this case, the reproduction level and the missing level may be set by using the audio generated in the assist system as a reference. Alternatively, this system may be utilized considering that the intonation in the audio output by the assist system is missing by using the normal conversation as a reference, for example. With this configuration, it is also possible to cause this remote communication system to function as the assist system. Also regarding the image, a processed image or the like of the user can be used as the image of the first user according to the present technology.

Various other requests may be included as the request for the output information. A request related to information, for example, the presence/absence of the audio, the resolution, bit rate, and frame rate of the video, and the bit rate of the audio may be sent.

The processing of complementing missing input information may be executed by the communication terminal on the receiver side, another server apparatus constructed over the network, and the like. In addition, the apparatus that executes complementation processing may be dynamically switchable on the basis of communication band and communication speed between those apparatuses. With this configuration, smooth remote communication is realized.

Hereinabove, the case where the information processing method according to the present technology is executed by the computer such as the PC operated by the user has been described. However, the information processing method and the program according to the present technology may be executed by another computer capable of communicating with the computer operated by the user via the network and the like. Further, the communication system according to the present technology may be constructed by the linkage of the computer operated by the user with another computer.

That is, the information processing method and the program according to the present technology may be executed not only in a computer system configured by a single computer but also in a computer system in which a plurality of computers cooperatively operate. It should be noted that in the present disclosure, the system means an aggregate of a plurality of components (apparatus, module (parts), and the like) and it does not matter whether or not all the components are housed in the same casing. Therefore, a plurality of apparatuses housed in separate casings and connected to one another via a network and a single apparatus having a plurality of modules housed in a single casing are both the system.

The execution of the information processing method and the program according to the present technology by the computer system includes, for example, both of a case where acquisition of the input information, control of generation of the output information based on the request information and the like, calculation of the reliability of the output information, generation of the request information, estimation of the generatable level of the output information, and the like are executed by a single computer and a case where those processes are executed by different computers. Further, the execution of the respective processes by a predetermined computer includes causing the other computer to some or all of those processes and acquiring results thereof.

That is, the information processing method and the program according to the present technology are also applicable to a cloud computing configuration in which one function is shared and cooperatively processed by a plurality of apparatuses via a network.

At least two features of the features according to the present technology which have been described above may be combined. That is, the various features described in the respective embodiments may be arbitrarily combined across the respective embodiments. Further, the above-mentioned various effects are merely exemplary and not limitative, and further other effects may be provided.

It should be noted that the present technology can also take the following configurations.
(1) An Information Processing Apparatus, Including:
 an acquisition unit that acquires input information including at least one of an image or audio of a first user; and
 a generation control unit that controls, on the basis of request information including a request to output information including at least one of an image or audio and the acquired input information, generation of output information related to the first user to be output by a terminal of a second user who is a communication partner of the first user.
(2) The information processing apparatus according to (1), in which
 the request information includes at least one of a request from the second user, which is related to image display, or a request from the second user, which is related to audio reproduction.
(3) The information processing apparatus according to (1) or (2), in which
 the generation control unit complements the image of the first user, which is included in the input information, and generates the output information.
(4) The information processing apparatus according to any one of (1) to (3), in which
 the generation control unit complements the audio of the first user, which is included in the input information, and generates the output information.
(5) The information processing apparatus according to any one of (1) to (4), further including:
 a calculation unit that calculates reliability of the output information; and
 a reliability sending unit that sends the calculated reliability to the terminal of the second user.
(6) The information processing apparatus according to (5), in which
 the reliability of the output information includes at least one of reliability related to the image or reliability related to the audio.
(7) The information processing apparatus according to (5) or (6), in which
 the request information includes a request related to the reliability of the output information.
(8) The information processing apparatus according to any one of (1) to (7), further including
 an estimation unit that estimates a generatable level of the output information on the basis of at least one of state information of the first user or situation information of the first user.
(9) The information processing apparatus according to (8), in which
 the level of the output information includes at least one of a displayable level of the image of the first user or a reproducible level of the audio of the first user.
(10) The information processing apparatus according to (8) or (9), further including
 a level sending unit that sends the estimated level of the output information to the terminal of the second user.
(11) The information processing apparatus according to any one of (1) to (10), further including
 a request information output unit that outputs the updated request information sent from the terminal of the second user receiving the generated output information to the generation control unit.
(12) The information processing apparatus according to (11), in which
 The information processing apparatus according to claim 11, in which
 the request information output unit outputs the updated request information based on contents of the output information and the reliability of the output information to the generation control unit.
(13) The information processing apparatus according to (11) or (12), in which
 The information processing apparatus according to claim 11, in which
 the request information output unit outputs the updated request information based on the generatable level of the output information to the generation control unit.
(14) The information processing apparatus according to any one of (1) to (13), in which
 at least one of the acquisition unit or the generation control unit is provided in a server apparatus capable of communicating with each of a terminal of the first user and the terminal of the second user.
(15) An information processing system, comprising:
 a first communication terminal; and
 a second communication terminal, wherein
 the first communication terminal sends request information including a request to output information including at least one of an image or audio to the second communication terminal, and
 the second communication terminal acquires input information including at least one of an image or audio of a user and controls generation of the output information related to the user on the basis of the request information sent from the first communication terminal and the acquired input information.

REFERENCE SIGNS LIST

1 network
5, 5a, 5b user (person who perform communication)
10, 10a, 10b communication terminal
10X communication terminal on sender side
10Y communication terminal on receiver side 11 controller
13 microphone
14 camera
20 communication unit
30 audio acquisition unit
31 audio analysis unit
32 video acquisition unit
33 video analysis unit
36 data request receiving unit
37 communication data generation unit
46 reliability calculation unit
50 data request unit
100 communication system

The invention claimed is:

1. An information processing apparatus, comprising:
a central processing unit (CPU) configured to:
input information including at least one of a first user image or a first user audio;
estimate a generatable level of output information based on environment information of a first user terminal, wherein the generatable level of the output information includes at least one of a displayable level of the first user image or a reproducible level of the first user audio;
control transmission of information that indicates the generatable level of the output information to a second user terminal;
receive request information from the second user terminal, based on the transmitted information that indicates the generatable level of the output information;
control generation of the output information based on the request information received from the second user terminal; and
output the generated output information to the second user terminal, wherein the second user terminal is a communication partner of the first user terminal.

2. The information processing apparatus according to claim 1, wherein the request information received from the second user terminal includes at least one of a request related to display of the first user image or a request related to reproduction of the first user audio.

3. The information processing apparatus according to claim 1, wherein the CPU is further configured to:
complement the first user image with auxiliary information; and
control generation of the output information based on the complemented first user image.

4. The information processing apparatus according to claim 1, wherein the CPU is further configured to:
complement the first user audio with auxiliary information; and
control generation of the output information based on the complemented first user audio.

5. The information processing apparatus according to claim 1, wherein the CPU is further configured to:
calculate a reliability parameter of the output information; and
send the calculated reliability parameter of the output information to the second user terminal.

6. The information processing apparatus according to claim 5, wherein the reliability parameter of the output information includes at least one of a reliability parameter related to the first user image or a reliability parameter related to the first user audio.

7. The information processing apparatus according to claim 5, wherein the request information received from the second user terminal includes a request related to the reliability parameter of the output information.

8. The information processing apparatus according to claim 1, wherein the CPU is further configured to estimate the generatable level of the output information based on at least one of first user state information or first user situation information.

9. The information processing apparatus according to claim 8, wherein the CPU is further configured to send the estimated generatable level of the output information to the second user terminal.

10. The information processing apparatus according to claim 1, wherein the CPU is further configured to receive updated request information from the second user terminal based on the generated output information.

11. The information processing apparatus according to claim 10, wherein the CPU is further configured to receive the updated request information based on contents of the output information and a reliability parameter of the output information.

12. The information processing apparatus according to claim 10, wherein the CPU is further configured to receive the updated request information based on a change in the generatable level of the output information.

13. The information processing apparatus according to claim 1, further comprising a server apparatus configured to communicate with each of the first user terminal and the second user terminal.

14. The information processing apparatus according to claim 1, wherein the environment information of the first user terminal includes time-zone information, walking state information, moving state information, or a location of the first user terminal.

15. An information processing method, comprising:
in a computer system,
acquiring input information including at least one of a first user image or a first user audio;
estimating a generatable level of output information based on environment information of a first user terminal, wherein the generatable level of the output information includes at least one of a displayable level of the first user image or a reproducible level of the first user audio;
controlling transmission of information that indicates the generatable level of the output information to a second user terminal;
receiving request information from the second user terminal, based on the transmitted information that indicates the generatable level of the output information;
controlling generation of the output information based on the request information received from the second user terminal; and
outputting the generated output information to the second user terminal, wherein the second user terminal is a communication partner of the first user terminal.

16. A non-transitory computer-readable medium having stored thereon, computer-executable instructions which, when executed by a processor, cause the processor to execute operations, the operations comprising:
acquiring input information including at least one of a first user image or a first user audio;
estimating a generatable level of output information based on environment information of a first user terminal, wherein the generatable level of the output information includes at least one of a displayable level of the first user image or a reproducible level of the first user audio;

controlling transmission of information that indicates the generatable level of the output information to a second user terminal;

receiving request information from the second user terminal, based on the transmitted information that indicates the generatable level of the output information;

controlling generation of the output information based on the request information received from the second user terminal; and outputting the generated output information to the second user terminal, wherein the second user terminal is a communication partner of the first user terminal.

* * * * *